United States Patent
Oven et al.

(10) Patent No.: US 7,576,684 B2
(45) Date of Patent: Aug. 18, 2009

(54) INTEGRATED ATTITUDE ALTIMETER

(75) Inventors: James B. Oven, Plymouth, MN (US); Paul Kroonblawd, Lino Lakes, MN (US)

(73) Assignee: Honeywell International Inc., Morristown, NJ (US)

( * ) Notice: Subject to any disclaimer, the term of this patent is extended or adjusted under 35 U.S.C. 154(b) by 142 days.

(21) Appl. No.: 11/746,996

(22) Filed: May 10, 2007

(65) Prior Publication Data

US 2008/0278367 A1    Nov. 13, 2008

(51) Int. Cl.
*G01S 13/88* (2006.01)
*G01S 13/94* (2006.01)
*G01S 7/04* (2006.01)

(52) U.S. Cl. .......................... 342/120; 342/94; 342/121; 342/176

(58) Field of Classification Search ............ 701/4, 701/8–9, 14, 216; 342/120–122, 94, 63–65, 342/165, 173, 176, 342, 357.14
See application file for complete search history.

(56) References Cited

U.S. PATENT DOCUMENTS

| | | | |
|---|---|---|---|
| 4,431,994 A | 2/1984 | Gemin | |
| 5,410,317 A * | 4/1995 | Ostrom et al. | 342/65 |
| 5,777,573 A | 7/1998 | Klausing et al. | |
| 6,567,014 B1 * | 5/2003 | Hansen et al. | 340/980 |
| 6,750,807 B1 | 6/2004 | Hager et al. | |
| 2003/0210176 A1 | 11/2003 | Hager et al. | |
| 2004/0141170 A1 | 7/2004 | Jamieson et al. | |
| 2005/0179579 A1 | 8/2005 | Pinder et al. | |

* cited by examiner

*Primary Examiner*—Thomas H Tarcza
*Assistant Examiner*—Cassi Galt
(74) *Attorney, Agent, or Firm*—Fogg & Powers LLC

(57) ABSTRACT

An aircraft electronics system is provided that includes a radar system, a display, an embedded global positioning/inertial navigation system (EGI) and a processor. The radar system is configured to generate aircraft operational data. The display is configured to display the aircraft operational data. The EGI is configured to generate aircraft behavior components and the processor configured to override the aircraft operation data displayed on the display when at least one of the aircraft behavior components is beyond a defined limit, wherein potentially incorrect aircraft operational data affected by at least one of the aircraft behavior component is not displayed.

12 Claims, 2 Drawing Sheets

INTEGRATED ATTITUDE ALTIMETER

BACKGROUND

High performance aircraft, such as fighter jets, present special problems relating to the determination of flight information such as the aircrafts altitude during extreme rolls and pitches. In particular, during severe rolls and pitches of the aircraft, altimeters are prone to report an incorrect altitude of the aircraft to a pilot. The pilot will only receive valid altimeter information after the extreme roll or pitch has passed. However, a delay is encountered since the radar will have to change tracking from the incorrect altitude to the correct altitude.

For the reasons stated above and for other reasons stated below which will become apparent to those skilled in the art upon reading and understanding the present specification, there is a need in the art for a method of effectively dealing with incorrect data produced in response to a extreme maneuvers of the aircraft.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment, an aircraft electronics system is provided. The system includes a radar system, a display, an embedded global positioning/inertial navigation system (EGI) and a processor. The radar system is configured to generate aircraft operational data. The display is configured to display the aircraft operational data. The EGI is configured to generate aircraft behavior components and the processor configured to override the aircraft operation data displayed on the display when at least one of the aircraft behavior components is beyond a defined limit, wherein potentially incorrect aircraft operational data affected by at least one of the aircraft behavior component is not displayed.

BRIEF DESCRIPTION OF THE DRAWINGS

The present invention can be more easily understood and further advantages and uses thereof more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims and equivalents thereof.

Embodiments of the present invention provide and apparatus and method for reporting not valid altimeter outputs and re-establishing correct altimeter outputs in a relatively fast manner. In particular, in embodiments of the present invention, aircraft behavior components are monitored. When a component, such as roll, exceeds a select degree parameter, the altimeter display is configured to display a message that the altimeter reading is not valid. Further in embodiments, the altimeter reading right before the select degree is exceeded is stored in memory. When the aircraft's roll component, goes below another select degree limit, roll resume is restored. At this point, altitude is tracked starting from the stored altitude in memory. This reduces a delay in generating a correct altimeter reading.

Figure 1:
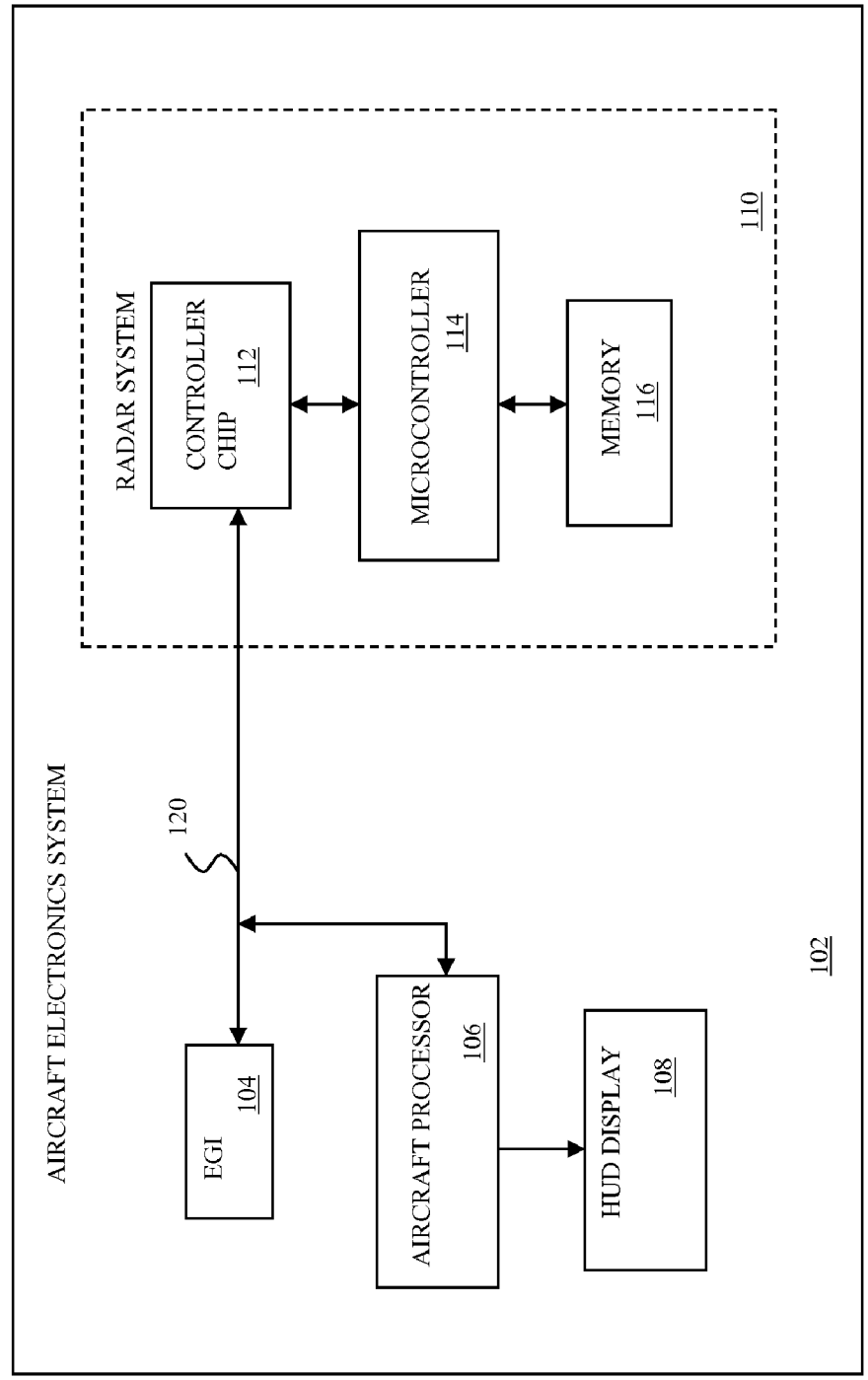
FIG. 1 is a block diagram of an aircraft electronic system of one embodiment of the present invention.

Referring to FIG. 1, one embodiment of an aircraft electronics system 100 is illustrated. In this embodiment, the aircraft electronics system 102 includes a radar system 110, an embedded global positioning system/inertial navigation system (EGI) 104, and aircraft processor 106, a heads up display (HUD) display and a bi-directional bus 102. The radar system 110 includes a controller chip 112, a microcontroller 114 and a memory 110. The chip controller 112 in the radar system 110 determines a radar state based in part on input attitude data from the EGI 104 and the aircraft commands from the aircraft processor 106. The microcontroller 114 processes radar algorithms and provides radar information to the controller 112. The memory 116 of the radar system is used to store a radar operation flight code used by the microcontroller 114. The memory 116 is also used in embodiments to store operational behavior data of the aircraft. In one embodiment, the bus 120 is a 1553 bus 120 and the controller chip 112 is a 1553 controller chip 112. The HUD 108 displays the operation data (flight information) of the aircraft such as the aircraft's altitude under control of the aircraft processor 106.

Figure 2:
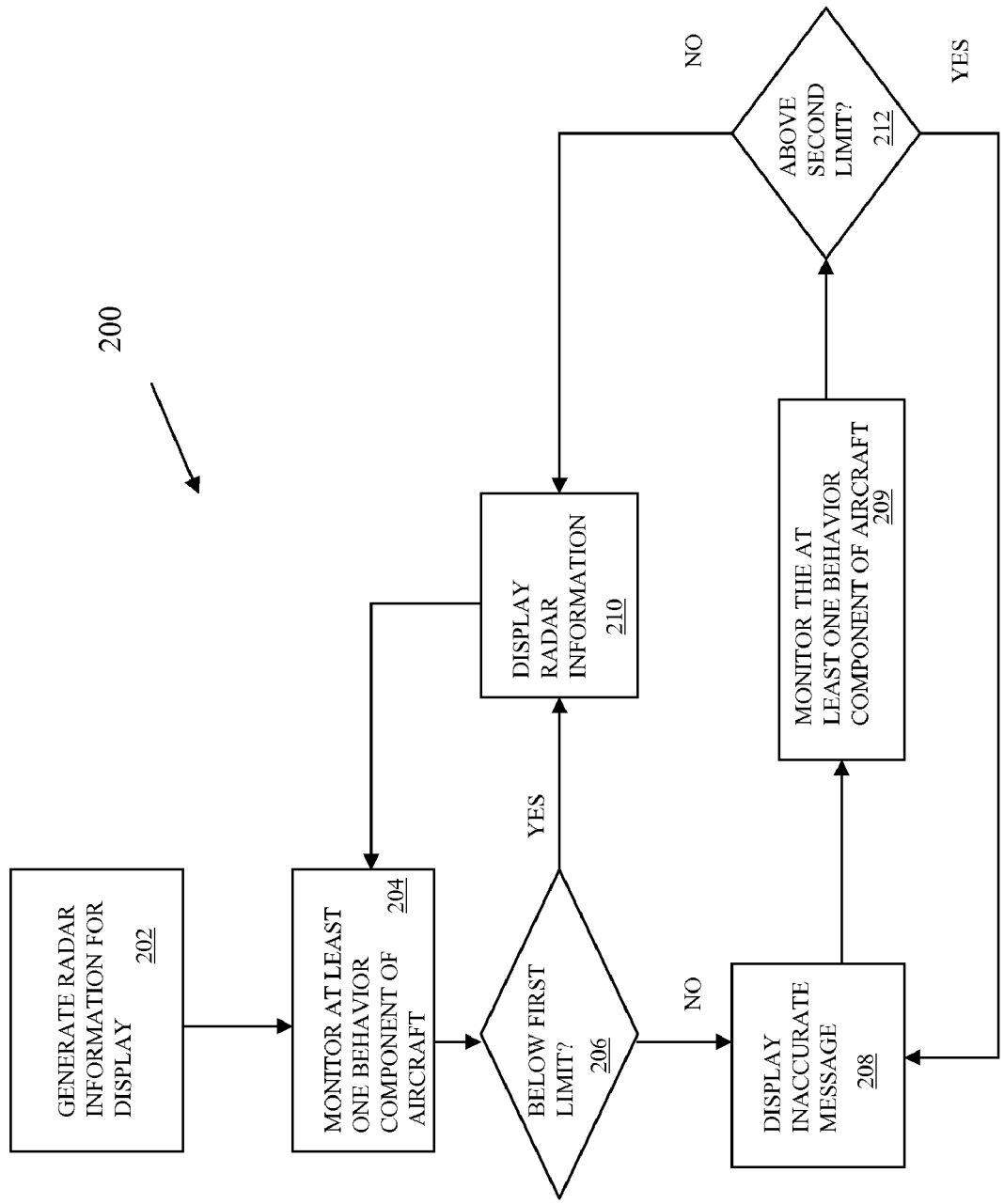
FIG. 2 is a flow diagram illustrating one method of implementing an embodiment of the present invention.

Referring to FIG. 2, a flow diagram 200 of one embodiment of the present invention is illustrated. As illustrated, the process starts by generating radar information for a display (202). At least one behavior component of the aircraft is monitored (204). Examples of behavior components include but are not limited to roll, pitch and yaw. In this embodiment, a behavior component is determined if it is below a first limit (206). For example, if the behavior component is roll, a first limit will be a roll degree. The first limit roll degree is selected based on knowledge of when an extreme roll degree will affect the operational data of the aircraft such as the aircraft's altitude data. For example, if a roll of the aircraft over 60 degrees affects the accuracy of altitude data the first limit will be set for 60 degrees. If the roll of the aircraft is under 60 degrees (206), radar information (altitude) is displayed (210) and the roll is continued to be monitored at (204). If the roll of the aircraft is over 60 degrees (206), an inaccurate information message is displayed (208) so the pilot will not rely on the data.

In the roll example, the period of time when the roll degree is above the first limit can generally be referred to as the roll inhibitive period. The behavior component (roll in this example) is then monitored at (209). It is then determined if the roll is above a second limit (212). The second limit can be different than the first limit. For example, the second limit in the roll example may be 59.5 degrees. If the roll is above the second limit (212), the inaccurate data message is continued to be shown at (208). If the roll of the aircraft is below the second limit (212), the operational data (altitude in this example) is displayed at (210). The period of time when the roll degree is below the second limit can generally be referred to as the roll resume period. In the roll example, the altitude of the aircraft as the aircraft reaches the first limit is stored in a memory, such as memory 116 of FIG. 110. When the roll resume period is entered, the stored altitude is loaded into the radar system and the altitude is tracked from the stored altitude position. This reduces the time needed by the radar system to determine a current altitude. The present invention is not limited to roll behavior components and that the limits will vary depending on the behavior component.

The methods and techniques of the aircraft electronics system 100 described above may be implemented using digital electronic circuitry, or with a programmable processor (for example, a special-purpose processor or a general-purpose process such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed application-specific integrated circuits (ASICs).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. An aircraft electronics system, the system comprising:
a radar system configured to generate aircraft operational data;
a display configured to display the aircraft operational data;
an embedded global positioning/inertial navigation system (EGI) configured to generate aircraft behavior components; and
a processor configured to override the aircraft operation data displayed on the display when at least one of the aircraft behavior components is beyond a defined limit, wherein potentially incorrect aircraft operational data affected by at least one of the aircraft behavior component is not displayed;
wherein the processor stores altitude data from the aircraft operational data upon the aircraft behavior components reaching a first degree limit within the defined limit; and
wherein the radar system loads the stored altitude data and tracks altitude starting from the stored altitude when the aircraft behavior components return to a second degree limit within the defined limit.

2. The aircraft electronic system of claim 1, wherein the processor is further configured to display the aircraft operation data when the at least one aircraft behavior component returns within the defined limit.

3. The aircraft electronic system of claim 2, further comprising:
a memory to store the aircraft operation data as the at least one aircraft behavior component reaches the defined limit; and
wherein the radar system is configured to use the stored aircraft operational data in the memory when the at least one aircraft behavior component returns within the define limit to aid in the determination of the then current aircraft operational data.

4. The aircraft electronic system of claim 1, wherein the radar system further comprises:
a chip controller configured to output radar states based on attitude data communicated from the EGI and aircraft commands;
a microprocessor configured to process radar algorithms; and
a memory in communication with the microprocessor configured to store radar operational flight code.

5. The aircraft electronic system of claim 4, wherein the memory is flash memory.

6. The aircraft electronic system of claim 1, further comprising:
a bi-directional bus coupled to provide communications between the processor, the EGI and the radar system.

7. The aircraft electronic system of claim 6, wherein the bus is a 1553bus.

8. The aircraft electronic system of claim 1, wherein the aircraft operational data is altitude and the at least one aircraft behavior component is roll of the aircraft.

9. The aircraft electronic system of claim 8, the defined limit further comprises:
a first limit that sets an upper limit of a roll degree that indicates when the processor is to override the altitude reading; and
a second limit that sets a limit of a roll degree that indicates when the processor is to allow altitude readings to resume.

10. The aircraft electronics system of claim 1, wherein the at least one aircraft behavior is one of roll, pitch and yaw.

11. A method of operating an aircraft electronics system, the method comprising:
determining the altitude of the aircraft;
displaying the determined altitude;
monitoring the roll of the aircraft;
when the roll of the aircraft reaches a first degree limit, displaying an information message indicating that the determined altitude is inaccurate and ceasing to display altitude; and storing an altitude in a memory upon reaching the first degree limit; and tracking altitude starting from the stored altitude when the roll of the aircraft reaches a second limit.

12. The method of claim 11, further comprising:

monitoring the roll of the aircraft after reaching the first limit;

when the roll of the aircraft reaches a second degree limit, resuming the display of the determined altitude, wherein the second degree limit is less than the first degree limit.

\* \* \* \* \*